US005684055A

United States Patent [19]

Kumar et al.

[11] Patent Number: 5,684,055
[45] Date of Patent: Nov. 4, 1997

[54] SEMI-CONTINUOUS PRODUCTION OF SOLID STATE POLYMERIC FOAMS

[75] Inventors: Vipin Kumar, Seattle, Wash.; Henry G. Schirmer, Spartanburg, S.C.

[73] Assignee: University of Washington

[21] Appl. No.: 354,960

[22] Filed: Dec. 13, 1994

[51] Int. Cl.$^6$ ....................................................... C08J 9/00
[52] U.S. Cl. ...................... 521/79; 521/146; 521/180; 521/182; 264/45.3; 264/50; 264/176.1; 264/234; 264/237; 264/345; 264/348; 264/DIG. 13; 264/DIG. 83
[58] Field of Search ............................. 521/79, 146, 180, 521/182; 264/45.3, 50, 176.1, 234, 237, 345, 348, DIG. 13, DIG. 83

[56] References Cited

U.S. PATENT DOCUMENTS

| | | | |
|---|---|---|---|
| 4,456,571 | 6/1984 | Johnson | 264/45.5 |
| 4,473,665 | 9/1984 | Martini-Vvedensky et al. | 521/79 |
| 4,761,256 | 8/1988 | Hardenbrook et al. | 264/45.5 |
| 5,158,986 | 10/1992 | Cha et al. | 521/82 |
| 5,182,307 | 1/1993 | Kumar | 521/51 |
| 5,223,545 | 6/1993 | Kumar | 521/51 |
| 5,334,356 | 8/1994 | Baldwin et al. | 522/133 |

OTHER PUBLICATIONS

Vipin Kumar, *Microcellular Polymers: Novel Materials for the 21st Century,* Progress in Rubber and Plastics Technology, vol. 9, No. 1, pp. 54–70 (1993).

Chul B. Park et al., *Extrusion of Microcellular Filament: A Case Study of Axiomatic Design,* Cellular Polymers, MD-vol. 38, pp. 69–91, ASME 1992.

Vieth, Wolf R., *Diffusion In and Through Polymers,* Hanser Publishers (1991) Ch. 3.1, at p. 52.

*Primary Examiner*—James J. Seidleck
*Assistant Examiner*—Duc Truong
*Attorney, Agent, or Firm*—William J. McNichol, Jr.

[57] ABSTRACT

The present invention provides a method for the semi-continuous production of microcellular foam articles. In a preferred embodiment, a roll of polymer sheet is provided with a gas channelling means interleaved between the layers of polymer. The roll is exposed to a non-reacting gas at elevated pressure for a period of time sufficient to achieve a desired concentration of gas within the polymer. The saturated polymer sheet is then separated from the gas channelling means and bubble nucleation and growth is initiated by heating the polymer sheet. After foaming, bubble nucleation and growth is quenched by cooling the foamed polymer sheet.

27 Claims, No Drawings

SEMI-CONTINUOUS PRODUCTION OF SOLID STATE POLYMERIC FOAMS

TECHNICAL FIELD OF THE INVENTION

This invention relates generally to methods, apparatus and products for the production of articles of foamed polymers and more particularly to methods for the semi-continuous production of such materials. The foamed polymers may be microcellular with average bubble size in the range 2-25 μm or have bubble sizes that are smaller or larger than microcellular foams. The foamed polymers are normally closed-cell, non-porous materials.

BACKGROUND OF THE INVENTION

Solid state foamed polymers are generally closed cell plastic foams which contain a large number of very small cells or bubbles. Typically, such foams have a bubble density of more than $10^8$ cells per $cm^3$ with bubble diameters in the order of 10 μm. Compared with conventional solid polymers, solid state foamed polymers offer the possibility of a 20-80% reduction in material used while maintaining the essential mechanical properties of the polymer at relatively high levels. This in turn offers significant savings in material and transportation costs. Such lightweight polymers are particularly useful for applications where weight is a critical factor, for example in aircraft. In addition, preliminary data suggests that the microcellular polymers possess improved toughness and fatigue strength. This can be explained by the simple fact that these foams are derived from a polymer in the plastic solid state as opposed to the melt state. When an amorphous polymer is stretched at or slightly above its glass transition temperature, the resulting stretched polymer is oriented to the degree that it is stretched. Solid state foams, therefore exhibit cell walls of polymer in the oriented state.

Foamed polymers derived from the melted state have cell walls which are in the unoriented state. Unoriented cell walls derived from the melt state and oriented cell walls derived from the solid state have analogous properties to hot blown or unoriented films and oriented films, respectively. Hot blown films show low tensile strength, high elongation, little shrink and shrink force and poor flex life. Oriented films, on the other hand, show high tensile strength, low elongation, high shrink and shrink force and high flex life.

From this analogy one can see that foams derived from the solid state are uniquely different from foams derived from the melt state. It is not surprising, then, that properties such as toughness and fatigue strength would be quite different from foams derived from the melt state.

It is known that microcellular polymers can be produced by a two-step batch process in which a solid polymer is first exposed to a non-reacting gas, such as carbon dioxide or nitrogen, at elevated pressure for a period of time sufficient to achieve a concentration of gas in the polymer which is sufficient to permit bubble nucleation. The minimum gas concentration required for bubble nucleation varies with the gas/polymer system. For example, with polycarbonate and carbon dioxide a foam may be form employing 20-120 mg of carbon dioxide per gram of polycarbonate. A higher gas concentration leads to nucleation of a higher number of bubbles which results in small bubble size in the foam. The gas concentration may be uniform or nonuniform. Uniformity of concentration leads to a more homogeneous bubble structure.

After exposure to the gas the polymer is subsequently returned to normal pressure, producing a supersaturated sample, and heated to the foaming temperature, which is above the glass transition temperature of the gas-saturated polymer, thereby causing a large number of bubbles to nucleate in the polymer. The polymer is held at the foaming temperature for a period of time sufficient to achieve a foam of the desired density and then cooled to quench bubble nucleation and growth.

The average bubble size is, in part, governed by the number of bubbles that nucleate which, in turn, is influenced by the concentration of gas in the polymer. The density of the microcellular polymer can be controlled by varying the gas saturation pressure, the foaming time and the foaming temperature.

Using this process, microcellular foams have been successfully produced from many different amorphous polymers, such as polyvinyl chloride (PVC), polycarbonate, polystyrene and ABS copolymer. For example, U.S. Pat. No. 4,473,665 describes the production of microcellular polystyrene by saturation with nitrogen. For a review of recent advances in the field of microcellular polymers, see Kumar, V. (1993) Progress in Rubber and Plastics Technology, Vol. 9, pp. 54-70.

While methods for the production of discrete blocks, or sections, of microcellular polymer are well known in the art, attempts to produce continuous sheets or strips of these materials using the two-step process described above have been unsuccessful. Saturation of rolled polymer sheets with non-reacting gas is ineffective, with the gas being absorbed only at the exposed surfaces of the roll. On subjecting the gas-treated roll to elevated temperatures, foaming occurs only at the periphery of the polymer sheet.

Current methods for continuous production of microcellular polymer sheets consist of die-extruding molten polymer containing a foaming agent and passing the extruded polymer through a pair of cooled rollers (see, for example, U.S. Pat. No. 4,456,571). Park and Suh have produced continuous microcellular filaments by saturating a molten polymer with a gas at a specific temperature and pressure prior to initiating bubble nucleation by raising the temperature of the polymer while maintaining the gas pressure at the level used for saturation (Park, C. and Suh, N.P., "Extrusion of a Microcellular Filament", Cellular Polymers, V. Kumar and S. G. Advani, editors; MD Vol. 38, ASME, 1992, p. 69).

U.S. Pat. No. 4,761,256 to Hardenbrook et al. discloses a method for the continuous production of a microcellular plastic web material with an integral unmodified smooth skin, wherein a gas-impregnated plastic web is continuously delivered to a degassing device. The gas-impregnated plastic web is produced either by die extrusion under sufficiently high pressure to prevent bubble nucleation or by continuously drawing a nonimpregnated web through a pressurized chamber containing an inert gas. The latter technique is practical only for relatively thin webs, and will necessarily require a very large pressure chamber and complex dynamic seals in order to achieve sufficient gas concentration in the polymer.

There thus continues to be a need in the art for a simple, effective and inexpensive method for the continuous or semi-continuous production of microcellular polymer articles, sheets or filaments.

SUMMARY OF THE INVENTION

It is an object of the present invention to provide a method and apparatus for the semi-continuous production of microcellular polymer articles, sheets or filaments as well as foamed polymers where the average bubble size is outside of the range 2 to 25 μm (less than 2 μm or greater than 25 μm), which is traditionally considered a microcellular foam.

It is a further object of the present invention to provide a method for producing microcellular polymer articles, sheets or filaments for minimal cost.

It is an additional object of the present invention to provide such a method which can be performed simply and with commonly available blowing gases with optional use of nucleating agents. Calcium carbonate and other known nucleating agents may be employed.

It is yet a further object of the present invention to provide such a method which employs inert gases that are not environmentally hazardous.

Still a further object of the present invention is to provide foamed polymer articles, sheets or filaments derived from the above method, and foamed articles, sheets or filaments having cell walls of polymer in the oriented condition.

These and other objectives are achieved according to the present invention by providing a gas channeling or exposing means interleaved or positioned between the layers of a polymer article, sheet or filament. The gas channeling or exposing means preferably comprises a layer of flexible, gas permeable material, such as gauze, porous paper sheet, non-woven material, or particulate material, such as cornstarch. It has been found that use of the gas exposing material facilitates the permeation of gas into the body of the article, sheet or filament, enabling gas to enter the polymer surface and thereby reducing the time of gaseous diffusion into the polymeric article.

In a preferred embodiment of the present invention, a sheet of solid polymer is placed on a sheet of gas permeable material and the two layers of material rolled to form a roll consisting of layers of polymer interleaved with gas permeable material. The roll of interleaved polymer and gas permeable material can then be successfully foamed using the following process.

The interleaved roll is saturated under elevated pressure with a non-reacting gas which is soluble in the polymer for a time sufficient to achieve a desired concentration of gas within the polymer. After returning to normal pressure, the polymer sheet is gradually unrolled, separated from the gas permeable material, and drawn through a heating station for a time sufficient to achieve the desired foam density. Such a heating station may be a hot water bath or other means, where the saturated polymer is heated to the foaming temperature to initiate bubble nucleation and growth. After passing through the heating station, the polymer is cooled, for example, by drawing through a cold water bath, to quench bubble nucleation and growth. In order to prevent puckering of the foamed sheet, the polymer is held under tension while it is drawn through the heating and cooling stations.

The amount of bubble growth, and therefore the density of the resulting foam, is controlled by varying the heating station temperature and/or the rate at which the sheet moves through the heating and cooling steps of the process. Amorphous or semi-crystalline polymers with a maximum of about 30% crystallinity which have been quenched to the amorphous state and which can be foamed by the two-step batch process described above may also be successfully treated using the present invention. These include, for example, polystyrene, PVC, PMMA, polycarbonate, ABS copolymers and polyethylene terephthalate (PET). As used herein, the term "non-reacting gas" refers to a gas which does not react with the polymer being foamed. Gases which may be usefully employed in the present invention include nitrogen, carbon dioxide, air and argon.

In another aspect, the present invention comprises an array of shaped polymeric articles spaced apart by gas channeling or interleaving means, said array being assembled so that it can be readily moved into and out of a pressure chamber. The array can preferably be a roll of polymeric sheet material wherein a porous paper sheet is interleaved between surfaces of the polymeric sheet so that the surfaces of the rolled sheet material will be exposed to gas within a pressure chamber. The array can also comprise a stack of polymeric sheets with porous paper, particulate material, or netting or non-woven material separating the polymeric sheets. Folded, festooned, or wicket supported arrays can also be used.

The present invention provides a simple and effective way to form semi-continuous microcellular sheets of many different polymers, at minimal cost. The blowing gases employed are inexpensive, non-hazardous and readily available.

The above-mentioned and additional features of the present invention and the manner of obtaining them will be best understood by reference to the following more detailed description.

DETAILED DESCRIPTION OF THE INVENTION

In accordance with the present invention, semi-continuous sheets or strips of microcellular polymers are produced by first forming a roll of solid polymer sheet with a gas channeling means interleaved between the layers of polymer. The gas channeling means preferably consists of a layer of flexible gas permeable material. While porous paper sheet is a preferred material, other gas permeable materials, such as particulate material, gauze, mesh, and woven or non-woven fabrics, may also be successfully employed in the present invention. Polymers which may be successfully foamed using the present invention include polystyrene, PVC, polycarbonate, ABS, PMMA, and PET. In general, the class of glassy amorphous polymers with glass transition temperatures above ambient temperature are suitable for the present invention.

The roll of polymer sheet and gas channeling material is exposed under elevated pressure to a non-reacting gas which is soluble in the polymer for a time sufficient to achieve a desired concentration of gas within the polymer. This step is generally carried out at room temperature (around 21° C.), although a higher temperature may be employed to accelerate diffusion of the gas within the polymer. The pressure can be varied above tank supply pressure with booster pumps. For example, the preferred range when employing $CO_2$ is about 50 to 950 psi tank pressure. This can be increased to over 1,000 psi with a suitable booster pump. A pressure as high as 1400 psi is thought to be usable. The actual pressure chosen will depend on the desired final foam density and average bubble size. The preferred gas can depend upon the polymer being treated. For example, carbon dioxide is the preferred gas for use in foaming PET, PVC and polycarbonate, while nitrogen is the preferred gas for use in foaming polystyrene. The amount of time for which the polymer roll is exposed to gas varies with the thickness of the solid polymer sheet, the specific polymer-gas system, the saturation pressure, and the diffusion rate into the polymer, and is generally determined experimentally. However, periods of between 3 and 100 hours are typically employed. For example, when saturating a 0.020 in. thick sheet of PET with $CO_2$ a saturation time of between about 15 to 30 hours is preferred.

Following saturation of the polymer-gas permeable material roll, the roll is returned to normal pressure and mounted in proximity to a heating station, such as a hot water or glycerine bath maintained above the glass transition temperature of the gas-saturated polymer. The saturated polymer sheet is gradually unwound, separated from the gas permeable material and heated by drawing under tension through the heating station. The polymer sheet is thereby foamed in a continuous manner. After passing through the heating station, the polymer sheet is drawn through a cooling station, such as a cold water bath, a set of chilled rollers or simply air, to cool the polymer and stop bubble nucleation and growth. The temperature of the heating station as well as the rate at which the polymer sheet is drawn through the heating and cooling stations can be varied to provide sheets of varying bubble size and density.

The process described herein converts a roll of polymer sheet of a finite length into a roll of foamed sheet. The length of the solid polymer sheet that can be processed depends on the polymer-gas system. Once the polymer roll (permeated with a gas channeling means such as porous paper sheet) has been exposed to gas and is taken out from the pressure vessel to atmospheric pressure, the gas begins to leave the polymer sheet. Thus the roll must be processed into a foam promptly, within a certain "window of processability," to avoid excessive loss of gas from the polymer, which can result in an undesirable variation in the density of the foam produced. Thus, to obtain foamed sheets with a consistent density, only a finite length of the solid polymer sheet can be processed at one time. For this reason, the method of the present invention has been termed a "semi-continuous" process. The semi-continuous nature of the process, however, does not in principle limit the rate of production of the foamed sheets. A sufficient number of semi-continuous lines can be operated in parallel to meet any production rate requirements.

EXAMPLE 1

A strip of PET Kodapak 9921 film measuring 17 ft long, 3 in. wide and 0.020 in. thick was placed on a strip of paper towel having similar dimensions. The resultant PET-paper towel strip was then wound onto a tubular core to form a roll having alternate layers of PET and paper towel. This roll was placed in a pressure vessel and exposed to carbon dioxide at a pressure of 700 psi for 24 hours.

Following saturation with carbon dioxide, the PET-paper towel roll was removed from the pressure vessel, mounted on a spindle and suspended above a hot water bath maintained at 90° C. The end of the saturated PET strip was gradually unwound from the roll, separated from the paper towel, and held under tension by threading through a spring-loaded clamp. Bubble nucleation was initiated and the PET strip foamed by drawing the strip through the hot water bath. Bubble growth was then quenched by drawing the strip through a cold water bath maintained at 0° C. The PET strip was continuously drawn through the two water baths at a rate of approximately 10 cm/sec by engaging the strip between two rollers rotating in opposite directions.

The saturated PET strip began to foam immediately upon entering the hot water bath as indicated by a change in the transparency of the sheet from clear to opaque. The entire surface of the PET strip became opaque within 5 seconds of entering the bath, indicating that the carbon dioxide had permeated throughout the body of the PET-paper towel roll and fully saturated the roll. The foamed strip was flat and smooth, with even edges, and had a final length of 24 ft., width of 4.5 in. and thickness of 0.030 in. The specific gravity of the foam was 0.3, compared with solid PET specific gravity of 1.3.

COMPARATIVE EXAMPLES

A strip of PET film 17 ft long, 3 in. wide and 0.020 in. thick was placed on a strip of paper towel having similar dimensions. The resultant PET-paper towel strip was coiled to form a roll having alternate layers of PET and paper towel and saturated with carbon dioxide as described in Example 1.

Following saturation with carbon dioxide, the PET-paper towel roll was removed from the pressure vessel and foamed by placing in a hot water bath maintained at a temperature slightly below 100° C. for 10 minutes. Bubble nucleation and growth was quenched by placing the roll in a cold water bath maintained at 0° C. for 5 minutes. On uncoiling the roll, it was found that foaming had occurred in a very uneven fashion with more foaming occurring on the outer surfaces of the polymer roll and less towards the middle. It was found that the foamed polymer roll had a wavy or puckered appearance.

Another strip of PET was processed as in Example 1, except that the strip was not interleaved with a gas channeling or diffusion means. It was not possible to foam this strip.

EXAMPLE 2

A PET 5000 roll, 24 in wide×0.020 in thick×200 ft long was pressurized to 750–800 psi. The material foamed to 0.029 in thick×32 in wide. Foaming speed was 60 ft/min into hot water (96° C.) and exit speed was 90 ft/min.

EXAMPLE 3

Similar conditions to Example 2 were run for a PET 6000 roll which expanded to a comparable extent. The resulting material specific gravities were: 1.3 unfoamed 0.5 foamed.

EXAMPLE 4

PET G material was exposed to pressure under similar conditions to Examples 2 and 3. The material was subsequently foamed in 96° C. water. The resulting material specific gravity was 1.25 unfoamed and 0.17 foamed.

Although the present invention has been described in terms of specific embodiments, changes and modifications can be carried out without departing from the scope of the invention which is intended to be limited only by the scope of the appended claims.

We claim:

1. A method for foaming polymeric materials, comprising the steps of:
   (a) interleaving an article of polymeric material with a gas channeling means;
   (b) exposing the interleaved article at elevated pressure to a non-reacting gas which is soluble in the polymer for a time sufficient to achieve a desired concentration of gas within the polymer, thereby forming an exposed polymeric article which is at least partially gas-saturated;
   (c) separating the exposed polymer article from the interleaved gas channelling means; and
   (d) heating the exposed polymer article sufficiently to initiate bubble nucleation and to achieve desired bubble growth.

2. The method of claim 1 wherein a plurality of articles are interleaved with gas channeling means.

3. The method of claim 1 or 2 wherein the polymeric article is a continuous sheet folded in a festooned manner.

4. The method of claim 1 or 2 wherein the polymeric article is a stack of polymeric sheets.

5. The method of claim 1 or 2 wherein the polymeric article is a roll of polymeric material.

6. The method of claim 1 or 2 wherein the gas channelling means comprises a sheet of flexible, gas permeable material.

7. The method of claim 6 wherein the flexible, gas permeable material is porous paper sheet.

8. The method of claim 1 or 2 wherein the gas channeling means is particulate material.

9. The method of claim 1 wherein bubble nucleation and growth is initiated by heating the exposed polymer article to above the glass transition temperature of the exposed polymer.

10. The method of claim 9 wherein bubble nucleation and growth is initiated by drawing the exposed polymer article through a heating means selected from the group consisting of hot liquid baths, hot gas or gases, and radiant heaters.

11. The method of claim 10 wherein the exposed polymer article is held under tension while being drawn through the heating means.

12. The method of claim 1 wherein bubble nucleation and growth is terminated by cooling the exposed polymer article.

13. The method of claim 1 or 2 wherein the polymer article is selected from the group consisting of polystyrene, polyvinyl chloride, polycarbonate, PMMA, ABS copolymers and polyethylene terephthalate.

14. The method of claim 1 or 2 wherein the non-reacting gas is selected from the group consisting of nitrogen, carbon dioxide and air.

15. The method of claim 1 or 2 wherein the polymer article is polyethylene terephthalate and the non-reactive gas is carbon dioxide.

16. The method of claim 15 wherein the gas channelling means is a sheet of flexible, gas permeable material.

17. The method of claim 16 wherein the gas permeable material is porous paper sheet.

18. The method of claim 15 wherein the interleaved article is exposed to carbon dioxide at a pressure in the range of about 50 to about 1400 psi.

19. The method of claim 15 wherein the interleaved article is exposed to carbon dioxide for a period of between about 3 and about 100 hours.

20. The method of claim 15 wherein bubble nucleation and growth is initiated by heating the exposed polymer article to a temperature in the range of about 80° C. to about 200° C.

21. The method of claim 15 wherein bubble nucleation and growth is quenched by cooling the exposed polymer article.

22. The method of claim 1 further comprising the step of cooling the polymer article after bubble nucleation and growth.

23. The method of claim 22 wherein the cooling is accomplished by natural convection.

24. The method of claim 23 wherein the cooling is accomplished by forced convection.

25. The method of claim 24 wherein the cooling is accomplished by drawing the polymer article through a means for cooling.

26. The method of claim 24 wherein the cooling of the polymer article is accomplished by drawing the polymer article through cold air.

27. The method of claim 24 wherein the cooling of the polymer article is accomplished by drawing the polymer article through cold water.

* * * * *

UNITED STATES PATENT AND TRADEMARK OFFICE
CERTIFICATE OF CORRECTION

PATENT NO. : 5,684,055
DATED : November 4, 1997
INVENTOR(S) : Kumar et al.

It is certified that error appears in the above-identified patent and that said Letters Patent is hereby corrected as shown below:

Title page, after "[75] Inventors: Vipin Kumar, Seattle, Wash.; Henry G. Schirmer, Spartanburg, S.C." please insert --Mark R. Holl, Seattle, Wash.--.

Signed and Sealed this

Third Day of February, 1998

Attest:

BRUCE LEHMAN

Attesting Officer

Commissioner of Patents and Trademarks